Aug. 4, 1925.

E. L. MUELLER

LITHOGRAPHIC SCRAPER

Filed Dec. 30, 1922

1,548,157

INVENTOR
Emil L. Mueller
BY
ATTORNEY

Patented Aug. 4, 1925.

1,548,157

UNITED STATES PATENT OFFICE.

EMIL L. MUELLER, OF RUTHERFORD, NEW JERSEY.

LITHOGRAPHIC SCRAPER.

Application filed December 30, 1922. Serial No. 609,925.

*To all whom it may concern:*

Be it known that I, EMIL L. MUELLER, a citizen of the United States, and resident of Rutherford, in the county of Bergen and State of New Jersey, have invented certain new and useful Improvements in Lithographic Scrapers, of which the following is a specification.

This invention relates to a lithographic "scraper"; that is, to a device to be used for applying pressure against the surface of a lithographic stone in printing.

An object of the invention is to provide a "scraper" which is of strong and substantial construction and having a wiper element with means whereby such element may be readily and easily stretched, and kept in a proper and efficient operating condition.

A further object is to so arrange the device that the stretching of the wiper element may be effected without necessity for removal of the "scraper" from its carrying box.

A more detailed object is to design a "scraper" comprising a strong and substantial, but light, body adapted to be held in operative position within the usual scraper box, to provide a wiper element adapted to be stretched in wiping or scraping position along the lower edge of the body, and to provide simple and efficient mechanism carried by the body and engaging the wiper operable to stretch the wiper by simple manipulation of an appropriate and easily accessible handle element.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification, and in which I have shown merely a preferred form of embodiment of the invention:—

Figure 1:
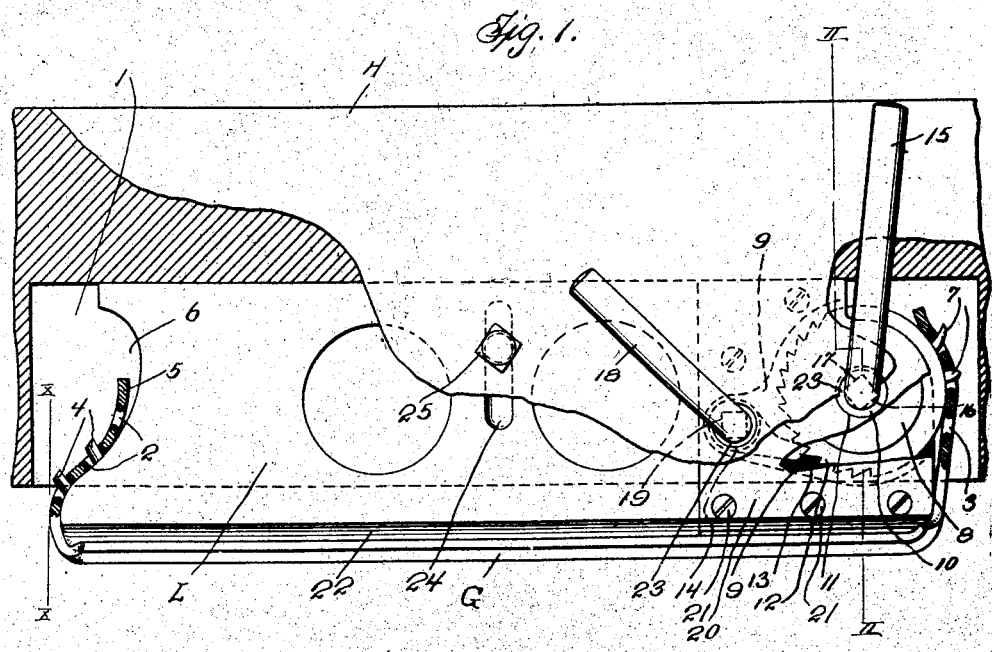
Figure 2:
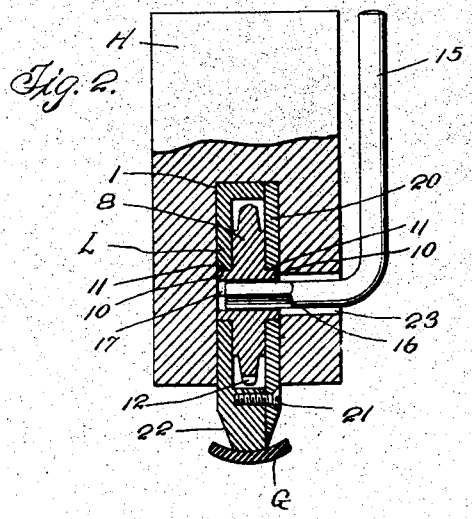

Figure 1 is a side elevational view of a scraper constructed in accordance with this invention, showing the same as it appears in use and assembled with the scraper box, portions of the scraper and box being shown in vertical section for the disclosure of details, and Figure 2 is a vertical transverse sectional view taken substantially upon the plane of line II of Fig. 1.

Referring to the drawings for describing in detail the structure which is therein illustrated, the reference character L indicates the scraper body, while the reference character G indicates the wiper element.

The body L is preferably in the form of a thick elongated plate arranged horizontally and having the wiper element stretched along beneath its under edge, the upper portion of the body being adapted to be received within an appropriately shaped pocket 1 of the carrier H in the usual manner.

Usually the body is formed as a single integral casting, of aluminum, or other suitable light, but strong, material, and its proportions are such that it will be capable of withstanding, without distortion, a very heavy pressure downwardly upon its upper edge.

The wiper G is usually formed of a strip of leather being provided with a series of eyelets 2 at one end and a series of eyelets 3 at its opposite end, the eyelets 2 being adapted for engagement over one or more studs 4 which are rigidly connected with the body at one end, said end being suitably curved so as to carry the studs in a protected position within the vertical plane, as X, of the extreme end of the device so that said studs will be thereby not liable to injury in handling of the device and so that the end portion 5 of the wiper which may continue upwardly beyond the studs will be held always in a pocket, or recess, as 6, of the body where it will be protected against injury and will at no time interfere with convenient and easy handling of the device, and the eyelets 3 being adapted to be engaged by the studs 7 which project from the periphery of a tightener disc 8.

The tightener disc is rotatably mounted within a recess 9 of the body, being formed with opposite hub portions 10 for rotary engagement within bearing apertures 11 formed in the walls of the body at opposite sides of the recess.

A portion of the periphery of the tightener disc is provided with ratchet teeth 12 arranged to be engaged by a pawl 13 which is pivotally mounted within the recess 9, at one side of the disc, said pawl also having hub extensions, as 14, for rotary engagement within bearings of the body in the same manner as shown and described for the hub portions of the disc.

A suitable separately formed handle 15 is provided having a squared end 16 for engaging within the squared central opening 17 of the disc for manually rotating the disc at will to stretch the wiper, the pawl 13 meanwhile serving to retain the disc in any position to which it is rotated by the handle. Any suitable device may be provided for holding the pawl normally pressed against the periphery of the disc but preferably for this purpose a second separately formed handle 18 is provided, being substantially the same as the handle 15 and having its squared end adapted to engage within the squared opening 19 of the pawl. This handle, when inserted in the position as indicated in the drawing, Fig. 1, constitutes a weight for urging the pawl against the disc. After the disc has been rotated to properly tension the wiper then both of the handles 15 and 18 may be removed, leaving the pawl to be held in operative position by frictional pressure of the teeth of the disc against the pawl. Whenever it is necessary to release the disc, as for removal or renewal of the wiper, the handle 18 may be inserted and employed for forcing the pawl out from engagement with the teeth of the disc, thus leaving the disc free to rotate backwardly for disengaging the eyelets 3 from the studs 7.

To provide for assembly of the mechanism, it is desirable that a portion of the body forming one side wall of the recess 9 be made as a separate plate, as 20, held in position by suitable retaining means, as screws 21, so that it may be removed if at any time access to the recess is required. Normally this plate is held rigid with the body so that it materially reinforces the body in sustaining downward pressure from the carrier.

The lower horizontal edge portion of the body is preferably tapered, as at 22, to provide a portion of slightly reduced width suitable for properly supporting the wiper element.

It is to be particularly noted that in accordance with this invention the carrier 8 may be provided with suitable openings 23 registering with the openings 17 and 19 of the tightener disc and the pawl respectively so that the handles 15 and 18 may be inserted into said openings 17 and 19 for operating the disc and pawl to adjust the wiper element without necessity for removing the device from the carrier.

Any appropriate means may be employed for retaining the scraper within the pocket 1 of the carrier, but as a simple expedient to this end it is intended that the body of the scraper shall be formed with an elongated depression 24 centrally thereof arranged to be engaged by the inner end of a set screw 25 received within a threaded opening thru one of the side walls of the pocket of the carrier. The engagement of the screw within the depression will not only serve to support the scraper against dropping downwardly from the pocket but will also serve to hold the scraper in a central position within the carrier.

While the drawing herewith shows the scraper to be provided with only a single tightener disc, it will nevertheless be understood that two such discs may be provided if desired; that is, that a second disc may be provided at the end of the body opposite to that shown, said disc to be connected with the adjacent end of the wiper by having its peripheral studs engaging within the eyelets 2. This arrangement may be of particular value especially where the scrapers are made in considerable length.

It has been above stated that the pawl 13 may be disconnected from the tightener, or ratchet disc by manipulation of handle 18. It should be mentioned, however, that, if desired, an operator may readily effect disconnection of the pawl by using the handle 15 to force the disc in tightening direction sufficiently to relieve the frictional grip against the pawl, thereby allowing the pawl to fall by gravity away from the teeth of the disc. It will be understood, of course, that this operation cannot be performed except when the handle 18 is disconnected and removed.

As many changes could be made in this construction without departing from the scope of the invention as defined in the following claims, it is intended that all matter contained in the above description or shown in the accompanying drawing, shall be interpreted as illustrative only and not in a limiting sense.

Having thus described my invention, what I claim as new and desire to secure by Letters Patent is:—

1. The combination with a carrier having a pocket therein, of a lithographic scraper arranged to be inserted in said pocket, the scraper comprising a body part, a wiper element carried thereby and pawl and ratchet mechanism with which to tighten the wiper element, together with a separate handle adapted to be interengaged with a part of the pawl and ratchet mechanism for operating said mechanism, and one wall of said pocket being formed with an opening therethru which said handle may be inserted into engagement with the pawl and ratchet mechanism.

2. A lithographic scraper comprising a body member having an elongated edge surface portion, a wiper element comprising a strip of flexible material fixed by one of its ends at one end of said edge surface and extending longitudinally along said edge surface, an adjustable tightener element carried by the body at the opposite end of said edge surface, the opposite end of said wiper strip being connected with said tightener element, and means to adjust said tightener element whereby it will hold said wiper strip tensioned longitudinally along said edge surface.

3. A lithographic scraper comprising a body member having an elongated edge surface portion, a wiper element comprising a strip of flexible material fixed by one of its ends at one end of said edge surface and extending longitudinally along said edge surface, an adjustable tightener element carried by the body at the oppostie end of said edge surface comprising a rotatably mounted disk to the peripheral portion of which the wiper strip is connected and a pawl arranged to engage the disk for retaining the disk in any position to which it is rotated, and a handle member for operating said pawl, said handle member being adapted also to constitute a weight for urging the pawl to engaging position.

In testimony whereof I affix my signature in the presence of two witnesses.

EMIL L. MUELLER.

Witnesses:
L. GESSFORD HANDY,
MAY SCHULZ.